United States Patent Office 2,909,465
Patented Oct. 20, 1959

2,909,465

1,4-DIPHENYL-3,5-DIKETO PYRAZOLIDINE COMPOUNDS AND COMPOSITIONS

Helmut Kraft, Mannheim, Germany, assignor to Knoll A.-G., Chemische Fabriken, Ludwigshafen (Rhine), Germany, a corporation of Germany No Drawing. Application September 9, 1953
Serial No. 379,304

Claims priority, application Germany September 18, 1952

15 Claims. (Cl. 167—65)

This invention relates to phenyl substituted pyrazolidine compounds and more particularly to 1,4-diphenyl-3,5-diketo pyrazolidine compounds, and to a process of making same.

It is one object of this invention to provide new and useful 1,4-diphenyl-3,5-diketo pyrazolidine compounds, their tautomeric forms, and their salts.

Another object of this invention is to provide new and highly effective analgetic and antipyretic compositions comprising such new 1,4-diphenyl-3,5-diketo pyrazolidine compounds, their tautomeric forms, and their salts. The analgetic and/or antipyretic activity of these new compounds is far superior to that of known compounds of similar constitution.

A further object of this invention is to provide a simple and effective process of making such new and valuable 1,4-diphenyl-3,5-diketo pyrazolidine compounds, their tautomeric forms, and their salts.

Other objects of this invention and advantageous features thereof will become apparent as the description proceeds.

In principle, the new compounds correspond to the following formula

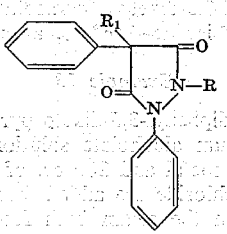

In this formula R indicates hydrogen, an alkyl residue, preferably a lower alkyl residue and especially methyl, an aralkyl residue, such as a benzyl, while $R_1$ represents hydrogen, an alkyl residue, preferably a lower alkyl residue, or an aralkyl residue, such as a benzyl residue.

Various methods may be used for making these new compounds. A preferred mode of preparation consists in condensing phenyl malonic acid, its dialkyl esters, ester amides, or dihalogenides with phenyl hydrazine or β-alkyl substituted derivatives thereof, preferably in the presence of alkaline agents or of acid binding agents.

To carry out this process, phenyl malonic acid diethyl ester is, for instance, condensed with phenyl hydrazine or with β-alkyl phenyl hydrazines in the presence of sodium alcoholates, such as sodium methylate, sodium ethylate, or of sodium metal, or of sodium amide. Thereby, two molecules of alcohol are split off. When starting with phenyl malonic acid dihalogenide, the reaction is preferably carried out in an indifferent solvent in the presence of an acid binding agent, such as a tertiary base, for instance, dimethyl aniline, pyridine, collidine and the like.

Another method of producing said compounds comprises reacting phenyl malonic acid with N-acyl phenyl hydrazines or their β-alkyl substituted derivatives in the presence of acid condensing agents, such as phosphorus trichloride.

Compounds carrying a second substituent in 4-position may also be obtained by reacting the unsubstituted 1,4-diphenyl-3,5-diketo pyrazolidines with halogen containing derivatives of the desired substituents in the presence of alkaline agents, such as alcoholic alkali hydroxide solutions or alkali alcoholates. When using one mol of the corresponding halogen derivative, only the 4-position is substituted while, when working with more than one mol of said halogen derivative, the 2-position is substituted at the same time.

New diketo pyrazolidine compounds according to the present invention which have a mobile hydrogen atom in their molecule are capable to form salts with basic compounds, said salt formation being due to the keto groups being enolized. The alkali metal, earth alkali and magnesium salts and salts with certain organic bases are readily soluble in water. Their aqueous solutions are of slightly alkaline reaction and, therefore, are suitable for the production of injectable solutions. Such salts are obtained, for instance, by reacting said diketo pyrazolidine compounds with aqueous or alcoholic alkali hydroxides or with organic bases, such as diethylamine, ethylene diamine, diethylamino ethanol, mono-, di- and tri-ethanolamine and the like. They form colorless compounds which are readily soluble in water and alcohol.

The new diketo pyrazolidine compounds differ essentially from known compounds of this class by the presence of a phenyl residue in 4-position. Said phenyl residue, apparently has a very favorable effect upon these compounds. For instance, compared with the very widely used analgetic and antipyretic 1-phenyl-2,3-dimethyl-4-dimethylamino-5-pyrazolone, known as "pyramidon," the analgetic effect of 1,4-diphenyl-3,5-diketo pyrazolidine is about 10 times as high as that of pyramidon, when tested on the white mouse.

The new compounds, and especially the above mentioned 1,4-diphenyl-3,5-diketo pyrazolidine, have been proved to be excellent analgetic and antipyretic agents. They may be applied orally in the form of tablets, pills, lozenges, syrups and the like preparation. They may, however, also be administered by injection. The alkali salts and the salts with physiologically harmless organic salts, such as the salts with diethylamine, ethylenediamine, diethylamino ethanol and the like bases yield highly concentrated aqueous solutions of said new compounds which are well compatible to patients and do not cause any local irritation. Such solutions are used with great advantage for relieving pain caused by rheumatic and inflammatory diseases.

The following examples serve to illustrate this invention without, however, limiting the same thereto.

*Example 1*

94.4 g. of phenyl malonic acid ethyl ester mixed with 43.2 g. of phenyl hydrazine are added to a sodium alcoholate solution prepared from 9.3 g. of sodium metal and 166 cc. of absolute alcohol. The mixture is heated for 2 hours on the steam bath and is allowed to stand overnight. Thereafter, it is poured into 1 liter of water. Phenyl acetic acid phenyl hydrazide which is formed as a by-product precipitates thereby and is removed by filtration. The filtrate is acidified with dilute hydrochloric acid whereby 1,4-diphenyl-3,5-diketo pyrazolidine precipitates in the form of colorless crystals which are recrystallized from dioxane or acetic acid ethyl ester. Melting point: 233–234° C.

*Example 2*

94.4 g. of phenyl malonic acid diethyl ester are added, drop by drop, to a mixture of 9.3 g. of pulverized sodium metal in 100 cc. of water-free benzene. Thereafter 43.2 g. of phenyl hydrazine in 50 cc. of benzene are added, while stirring. The mixture is heated on the steam bath for 5 hours. Thereafter the reaction mixture is extracted several times with dilute sodium hydroxide solution. The combined alkaline extracts are acidified and yield 1,4-diphenyl-3,5-diketo pyrazolidine of the melting point 233–234° C.

*Example 3*

47.2 g. of phenyl malonic acid diethyl ester are added, while stirring mechanically, to a mixture of 100 cc. of benzene and 8 g. of sodium amide. Thereafter 21.6 g. of phenyl hydrazine in 30 cc. of benzene are added thereto. The reaction mixture is heated on the steam bath for 8 hours and is extracted with dilute sodium hydroxide solution. The combined alkaline extracts are acidified with dilute hydrochloric acid and yield 1,4-diphenyl-3,5-diketo pyrazolidine.

*Example 4*

47.2 g. phenyl malonic acid ethyl ester are added drop by drop, while stirring, to a mixture of 4.6 g. of sodium metal dust in 50 cc. of benzene. Thereafter 24.4 g. of β-methyl phenyl hydrazine in 30 cc. of benzene are added thereto. The reaction mixture is heated on the steam bath for 5 hours and is extracted several times with dilute sodium hydroxide solution. The combined extracts are acidified and yield 1,4-diphenyl-2-methyl-3,5-diketo pyrazolidine of the melting point of 114–115° C.

*Example 5*

22 g. of phenyl malonic acid dichloride are added drop by drop, while cooling with ice and stirring, to a mixture of 40 g. of dimethyl aniline and 150 cc. of benzene. 11 g. of phenyl hydrazine in 30 cc. of benzene are added thereto. The reaction mixture is stirred, while cooling, for 5 hours. Dimethyl aniline is removed by shaking with dilute hydrochloric acid. The pyrazolidine compound formed during said reaction is extracted with dilute sodium hydroxide solution and is, thus, separated from the benzene solution. The combined alkaline extracts are acidified and 1,4-diphenyl-3,5-diketo pyrazolidine precipitates in colorless crystals of the melting point 233–234° C.

*Example 6*

A mixture of 23.6 g. of phenyl malonic acid ethyl ester and 10.8 g. of phenyl hydrazine are heated in an oil bath to 170° C. until no more alcohol distills off. After cooling the solid residue is triturated with 2 N sodium hydroxide solution, the undissolved matter is separated and the filtrate is acidified with 2 N hydrochloric acid. Thereby 1,4-diphenyl-3,5 diketo pyrazolidine precipitates melting at 233–234° C.

*Example 7*

A mixture of 26 g. of phenyl malonic acid ethyl ester and 20 g. of hydrazo-benzene is added drop by drop at 150° C. within 5 hours to a solution of 2.8 g. of sodium metal in 70 cc. of absolute alcohol. The alcohol split off during reaction is continuously distilled off. The residue is dissolved in water while heating, undissolved matter is filtered off, the alkaline filtrate is extracted with ether and the ethereal extract is decolorized by means of animal charcoal.

*Example 8*

50.4 g. of 1,4 diphenyl-3,5-diketo pyrazolidine are added to a sodium alcoholate solution prepared from 2.6 g. of sodium metal and 100 cc. of absolute alcohol. The resulting clear solution is heated on the steam bath for 7 hours with 16 cc. of metal iodide. The precipitated sodium iodide is filtered off while still hot. 1,4-diphenyl-4-methyl-3,5-diketo pyrazolidine melting at 168° C. after recrystallization from butanol crystallizes from the filtrate on standing in an icebox.

*Example 9*

50.4 g. of 1,4-diphenyl-3,5-diketo pyrazolidine are dissolved in a sodium alcoholate solution prepared from 4.6 g. of sodium metal and 100 cc. of absolute alcohol. 22 cc. of ethyl iodide are added thereto and the mixture is heated on the steam bath for 12 hours. The precipitated sodium iodide is filtered off and the filtrate is kept in an icebox whereby 1,4-diphenyl-1-4-ethyl-3,5-diketo pyrazolidine crystallizes. After recrystallization from alcohol it melts at 172–173° C.

*Example 10*

50.4 g. of 1,4-diphenyl-3,5-diketo pyrazolidine are dissolved in a sodium alcoholate solution prepared from 4.6 g. of sodium metal and 100 cc. of absolute alcohol. 29 cc. of n-butyl bromide are added thereto and the mixture is heated on the steam bath for 24 hours. The precipitated sodium bromide is filtered off and 1,4-diphenyl-4-n-butyl-3,5-diketo pyrazolidine crystallizes on standing in an icebox. On recrystallization from alcohol the compound has a melting point of 168–169° C.

*Example 11*

50.4 g. of 1,4-diphenyl-3,5-diketo pyrazolidine are dissolved in a sodium alcoholate solution prepared from 4.6 g. of sodium metal and 100 cc. of absolute alcohol. 31 cc. of benzyl-chloride are added and the reaction mixture is heated on the steam bath for 12 hours. The precipitated sodium chloride is filtered off. 1,4-diphenyl-4-benzyl-3,5 diketo pyrazolidine crystallizes on standing in an icebox. Its melting point after recrystallization from alcohol is 176–177° C.

*Example 12*

13.3 g. of 1,4-diphenyl-4-methyl 3,5-diketo pyrazolidine are dissolved in a sodium alcoholate solution prepared from 1.15 g. of sodium metal and 50 cc. of absolute alcohol. 8.2 g. of benzyl chloride are added thereto and the reaction mixture is allowed to stand at room temperature for 48 hours. Thereby 1,4-diphenyl-2-benzyl-4-methyl-3,5-diketo pyrazolidine crystallizes. Its melting point is 115–116° C. after recrystallization from methanol.

*Example 13*

50.4 g. of 1,4-diphenyl-3,5-diketo pyrazolidine are dissolved in a sodium alcoholate solution prepared from 9.2 g. of sodium metal and 200 cc. of absolute alcohol. 78 g. of benzyl chloride are added thereto and the mixture is heated on the steam bath for 12 hours. The reaction mixture, thereafter, is poured into water and the precipitated oil is extracted with ether. The ethereal solution after drying and evaporation to dryness yields a light oil of 1,4-diphenyl-2,4-dibenzyl-3,5-diketo pyrazolidine which, on triturating with hexane, crystallizes. Melting point 110° C. on recrystallization from methanol.

*Example 14*

A mixture of 36.6 g. of β-methyl phenyl hydrazine and 100 g. of tetrahydronaphthalene is added drop by drop to a solution of 71 g. of phenyl malonic acid ethyl ester in 300 cc. of tetrahydronaphthalene at 170° C. within 8 hours, while stirring. The alcohol split off thereby is continuously distilled off, the reaction mixture is cooled and extracted with altogether 350 cc. of N-sodium hydroxide solution. The alkaline extract is acidified with dilute hydrochloric acid whereby 1,4-diphenyl-2-methyl-3,5-diketo pyrazolidine precipitates. Melting point 114–115° C. after recrystallization from acetic acid ethyl ester.

*Example 15*

126 g. of 1,4-diphenyl-3,5-diketo pyrazolidine are added to a sodium ethylate solution prepared from 11.5 g. of sodium metal and 200 cc. of alcohol. The clear solution is evaporated to dryness in a vacuum and the residue is triturated with absolute ether, filtered off by suction, and washed with ether. The resulting sodium salt is colorless and is readily soluble in water and alcohol.

In place of sodium ethylate solution there may be used the equivalent amount of aqueous sodium hydroxide solution.

When employing organic bases in equimolecular amounts, such as ethylenediamine, triethanolamine, diethylamino ethanol and other organic bases, the corresponding salts of said organic bases are obtained.

As stated above, the 1,4-diphenyl-3,5-diketo pyrazolidine compounds according to the present invention are highly effective analgetic and antipyretic agents. For therapeutical administration they are preferably diluted with a suitable pharmaceutical carrier. Such a carrier may either be a solid material or an injectable liquid such as water or physiological salt solution. As solid carrier there are employed substances as they are used in making tablets, pills, lozenges, dragees, and the like preparations which are administered perorally. One may also produce emulsions or suspensions of said active compound in water by means of emulsifying or dispersing agents, for instance, syrup preparations containing said compounds finely dispersed therein may be prepared. The new pyrazolidine compounds may furthermore be employed in the form of powders filled into gelatin capsules or the like. Such powders may be diluted by milling and mixing the pyrazolidine compound with a solid pulverulent extending agent to the desired degree of fineness or by impregnating the already milled, finely powdered, solid carrier with a solution of the alkali salt of said compound in water or with a solution of the compound itself in an organic solvent, such as dioxane, ether, alcohol and others, and then removing the water or solvent. For such purpose one may directly use solutions prepared for recrystallizing the pyrazolidine compound without isolating the crystalline compound therefrom.

When preparing tablets, pills, dragees and the like preparations, the commonly used diluting agents, binders, and the like are employed, such as sugar, lactose, talcum, starch, bolus alba, pectin, and as binders, gelatin, gum arabic, methyl cellulose, yeast extract, agar, tragacanth, and others.

Very effective preparations which are especially suitable in the treatment of severe rheumatic and other inflammatory diseases are injectable solutions of water soluble salts of pyrazolidine compounds according to this invention. Such injectable solutions possess a pH of between about 7.0 and about 8.5 and, thus, are readily injectable without causing irritation. They are readily compatible with the widely used 1-phenyl-2,3-dimethyl-4-dimethylamino-5-pyrazolone. Combinations of said two compounds have a low toxicity and an analgetic effect which is several times stronger than that of said pyrazolone derivative alone.

The following examples serve to illustrate various preparations as they are used with great success in human therapy. It is understood, however, that the use of the new compounds is not limited to the preparations given below but they may be used in any other suitable form.

*Example 16*

300 g. of 1,4-diphenyl-3,5-diketo pyrazolidine obtained, for instance, according to Example 1, are intimately mixed with 150 g. of starch and the mixture is granulated. 45 g. of talcum and 5 g. of stearic acid are added to said granulated mixture, and the resulting mass is tableted, yielding about 1000 tablets, each containing about 0.3 g. of 1,4-diphenyl-3,5-diketo pyrazolidine.

*Example 17*

18.4 g. of 1,4-diphenyl-3,5-diketo pyrazolidine are dissolved in 72.6 cc. of N sodium hydroxide solution. Sufficient water is added to bring the volume of the solution to 100 cc. The solution is filtered, filled into ampoules of 1.1 cc. each, the ampoules are sealed, and sterilized. Each ampoule contains a 20% solution of the sodium salt of said pyrazolidine compound.

*Example 18*

15 g. of the sodium salt of 1,4-diphenyl-3,5-diketo pyrazolidine are dissolved in about 75 cc. of water. 15 g. of 1-phenyl-2,3-dimethyl-4-dimethylamino-5-pyrazolone are dissolved in said solution which is then brought to a volume of 100 cc. After filling the solution into ampoules so that each ampoule contains 2.2 cc., sealing and sterilizing said ampoules, an injectable solution of the two analgetic compounds is obtained which contains per cc. about 300 mg. thereof.

*Example 19*

15 g. of the diethylamino ethanol salt of 1,4-diphenyl-3,5-diketo pyrazolidine are dissolved in 75 cc. of water. 15 g. of 1-phenyl-2,3-dimethyl-4-dimethylamino-5-pyrazolone are added thereto and dissolved therein. The solution is brought to a volume of 100 cc. and is filled into ampoules, each containing 1.5 cc. The ampoules are sealed and sterilized. The solution contains about 300 mg. of the two analgetic compounds per cc.

The following table shows the toxicity and the analgetic activity of the compounds according to the present invention in comparison with 1-phenyl-2,3-dimethyl-4-dimethylamino-5-pyrazolone:

| Compound or preparation | Toxicity, mouse | | 50% analgesia irritability by heat, mg./kg. | 50% analgesia Litchfield | |
|---|---|---|---|---|---|
| | subc., mg./kg. | intrav., mg./kg. | | irritability by heat, mg./kg. | electric stimulation, mg./kg. |
| 1-Phenyl-1,2,3-dimethyl-4-dimethylamino-5-pyrazolone | 263 | | 163.0 | 72.0 | 171.0 |
| 1,4-Diphenyl-3,5-diketo pyrazolidine | 808 | 337 | 7.8 | 6.8 | |
| Preparation containing 10% of Na-salt of 2, and 15% of 1 | 390 | 203 | 17.5 | 10.3 | 158.0 |

It is evident that the new pyrazolidine compounds such as the tested 1,4-diphenyl-3,5-diketo-pyrazolidine, have a remarkably high analgetic activity. Furthermore, they have a synergistic effect upon one of the best known and widely used analgetic agent, namely 1-phenyl-2,3-dimethyl-4-dimethylamino-5-pyrazolone. Mixtures thereof exhibit an analgetic activity which is many times higher than could be expected. Such mixtures show also a considerable decrease in toxicity which decrease considerably exceeds that which could be expected.

It may be pointed out that the toxicity of a preparation containing 15% of the sodium salt of 1,4-diphenyl-3,5-diketo pyrazolidine and 15% of 1-phenyl-2,3-dimethyl-4-dimethylamino-5-pyrazolone, tested in the same manner as preparations 1 to 3 of the above given table, corresponds to 400 mg./kg. on subcutaneous injection and to 186 mg./kg. on intravenous injection. This means that although the content of the pyrazolidine preparation according to the present invention is increased 50% over that of preparation 3 of the table, there is no appreciable increase in toxicity, demonstrating again the synergistic effect of said two analgetic substances.

It is, of course, understood that preparations for therapeutic use may contain smaller or larger amounts of the new pyrazolidine compounds than those given in Examples 16 to 19. They should, however, contain at least about 5% of said compounds. Daily dosage for the average child is a total of 0.5 g. to 1.0 g. given in doses of 0.1 g. to 0.3 g. every two to three hours. Adults are given 1.5 g. to 2 g. daily in subdivided doses of 0.2 g. to 0.5 g. every two to three hours. The minimum content of a tablet or other form of therapeutic composition thus is about 5%, and preferably about 20% to 30%.

Example 20

A mixture of 18 g. of phenyl malonic acid, 23 g. of β-acetyl phenyl hydrazine, and 22 g. of phosphorous trichloride are heated on the steam bath until hydrochloric acid development ceases. Ice water is added to the reaction mixture after allowing the same to cool. Thereby 1,4-diphenyl-3,5-diketo pyrazolidine precipitates. Melting point 233–234° C.

The term "a reactive malonic acid derivative," as used herein comprises not only malonic acid and β-substituted malonic acid but also malonic acid esters, malonic acid ester amides, malonic acid dihalogenides and other derivatives which are capable of reacting with phenyl hydrazine or its β-substitution products.

I claim:

1. The 1,4-diphenyl-3,5-diketo pyrazolidine compound of the formula

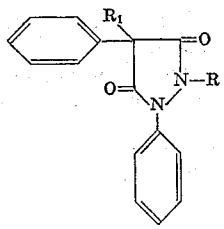

wherein R and $R_1$ indicate members selected from the group consisting of hydrogen, the lower alkyl radicals, and the benzyl radical, and pharmaceutically acceptable salts thereof with substantially non-toxic bases.

2. 1,4-diphenyl-3,5-diketo pyrazolidine.
3. 1,4-diphenyl-4-methyl-3,5-diketo pyrazolidine.
4. 1,4-diphenyl-4-ethyl-3,5-diketo pyrazolidine.
5. 1,4-diphenyl-4-n-butyl-3,5-diketo pyrazolidine.
6. 1,4-diphenyl-4-benzyl-3,5-diketo pyrazolidine.
7. 1,4-diphenyl-4-methyl-2-benzyl-3,5-diketo pyrazolidine.
8. 1,4-diphenyl-2,4-dibenzyl-3,5-diketo pyrazolidine.
9. 1,4-diphenyl-2-methyl-3,5-diketo pyrazolidine.
10. The alkali salts of 1,4-diphenyl-3,5-diketo pyrazolidine.
11. The diethylamino ethanol salt of 1,4-diphenyl-3,5-diketo pyrazolidine.
12. An injectable analgetic and antipyretic composition comprising a water soluble salt of 1,4-diphenyl-3,5-diketo pyrazolidine and 1-phenyl-2,3-dimethyl-4-dimethylamino-5-pyrazolone dissolved in a sterile parenteral water diluent.
13. An injectable analgetic and antipyretic composition according to claim 12, wherein the water soluble salt of 1,4-diphenyl-3,5-diketo pyrazolidine is the sodium salt.
14. An injectable analgetic and antipyretic composition according to claim 12, wherein the water soluble salt of 1,4-diphenyl-3,5-diketo pyrazolidine is the diethylamino ethanol salt.
15. An injectable analgetic and antipyretic composition according to claim 12, comprising a solution containing 15% of diethylamino ethanol salt of 1,4-diphenyl-3,5-diketo pyrazolidine and 15% of 1-phenyl-2,3-dimethyl-4-dimethylamino-5-pyrazolone.

References Cited in the file of this patent

UNITED STATES PATENTS

| | | |
|---|---|---|
| 2,427,911 | Kendall et al. | Sept. 23, 1947 |
| 2,562,830 | Stenzl | July 31, 1951 |

OTHER REFERENCES

| | | |
|---|---|---|
| 508,085 | Belgium | June 28, 1952 |
| 269,088 | Switzerland | Sept. 16, 1950 |
| 269,982 | Switzerland | Nov. 1, 1950 |
| 269,986 | Switzerland | Nov. 1, 1950 |

FOREIGN PATENTS

Ruhkopf: Ber. Deut. Chem., vol. 73B, 1940, pp. 802–22.

Lynn: Org. Chem., publ. by Lea et al., 3rd ed., 1948, p. 188.

Rheumatic Diseases, W. B. Saunders Co., Philadelphia, 1952, pp. 12–14 (based on Proc. of 7th Intl. Cong. on Rheumatic Dis, Chas H. Slocumb, M.D., Chairman).

Rechenbert: Helvetica Medica Acta, vol. 18, 1951, pp. 429–435.